(12) United States Patent
Lu et al.

(10) Patent No.: US 8,599,714 B2
(45) Date of Patent: Dec. 3, 2013

(54) METHOD AND SYSTEM FOR IMPLEMENTING LOCAL SWITCHING

(75) Inventors: Lei Lu, Shanghai (CN); Liang Gu, Chengdu (CN); Wei Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 73 days.

(21) Appl. No.: 13/204,085

(22) Filed: Aug. 5, 2011

(65) Prior Publication Data

US 2011/0286439 A1  Nov. 24, 2011

Related U.S. Application Data

(63) Continuation of application No. PCT/CN2009/076178, filed on Dec. 29, 2009.

(30) Foreign Application Priority Data

Feb. 6, 2009  (CN) .......................... 2009 1 0078002

(51) Int. Cl.
| | |
|---|---|
| G08C 15/00 | (2006.01) |
| H04J 1/16 | (2006.01) |
| H04J 3/14 | (2006.01) |
| H04W 24/00 | (2009.01) |

(52) U.S. Cl.
USPC ......... 370/252; 370/328; 370/338; 455/456.1

(58) Field of Classification Search
USPC ............... 370/338, 252, 328; 455/426.1, 436, 455/458, 456.1
See application file for complete search history.

(56) References Cited

U.S. PATENT DOCUMENTS 6,549,773 B1 * 4/2003 Linden et al. .............. 455/426.1
8,078,199 B2 * 12/2011 Wang et al. .................... 455/458

(Continued)

FOREIGN PATENT DOCUMENTS

| CN | 1391735 A | 1/2003 |
| CN | 1889760 | 1/2007 |

(Continued)

OTHER PUBLICATIONS

Second Chinese Office Action mailed Apr. 12, 2012 issued in corresponding Chinese Patent Application No. 200910078002.1 (5 pages) (4 pages English Translation).

(Continued)

*Primary Examiner* — Alpus H Hsu
*Assistant Examiner* — Anthony Luo
(74) *Attorney, Agent, or Firm* — Staas & Halsey LLP

(57) ABSTRACT

A method and a system for implementing local switching are disclosed. The method includes: after receiving the uplink data sent by a sending MS, determining, according to information carried in the uplink data, information about location of a receiving Mobile Station (MS) that is to receive uplink data; and implementing, according to local switching rules that specify a local switching control mode, local switching for data transmitted between the sending MS and the receiving MS if determining, according to the information about location of the receiving MS and information about location of the sending MS, that the data transmitted between the sending MS and the receiving MS meets local switching conditions. In this way, network transmission resources are saved in the process of transmitting data, transmission delay is shortened, and data transmission efficiency is improved.

13 Claims, 12 Drawing Sheets

(56) References Cited

U.S. PATENT DOCUMENTS

| | | | |
|---|---|---|---|
| 2005/0008138 | A1 | 1/2005 | King |
| 2005/0135385 | A1 | 6/2005 | Jenkins et al. |
| 2007/0140457 | A1 | 6/2007 | Crockett et al. |
| 2007/0298799 | A1* | 12/2007 | Molkdar et al. ............ 455/436 |
| 2011/0286439 | A1 | 11/2011 | Lu et al. |

FOREIGN PATENT DOCUMENTS

| | | |
|---|---|---|
| CN | 101159905 A | 4/2008 |
| CN | 101272626 | 9/2008 |
| CN | 101291538 | 10/2008 |
| CN | 101800911 | 10/2012 |
| KR | 10-2003-0008952 | 1/2003 |

OTHER PUBLICATIONS

Korean Office Action mailed Mar. 25, 2013 in corresponding Korean Patent Application No. 10-2011-7020410 (5 pages) (4 pages English Translation).

International Search Report, mailed Apr. 8, 2010, in International Application No. PCT/CN2009/076178.

WiMAX Call Localization (aka Local Breakout), Network Policy Based Call Localization, Kuntal Chowdhury, Starent Networks, Jan. 20, 2007, pp. 1-15.

International Written Opinion of the International Searching Authority mailed Apr. 8, 2010 in corresponding International Patent Application PCT/CN2009/076178.

Korean Office Action mailed Aug. 26, 2013 in corresponding Korean Patent Application No. 10-2011-7020410 (4 pages) (2 pages English Translation).

\* cited by examiner

METHOD AND SYSTEM FOR IMPLEMENTING LOCAL SWITCHING

This application is a continuation of International Application No. PCT/CN2009/076178, filed on Dec. 29, 2009, which claims priority to Chinese Patent Application No. 200910078002.1, filed on Feb. 6, 2009, both of which are incorporated herein by reference in their entirety.

FIELD OF THE INVENTION

The present invention relates to network communication technologies, and in particular, to a technology of implementing local switching in the process of network communication.

BACKGROUND OF THE INVENTION

With development of radio communication technologies, Packet Switched (PS) domain services such as Voice over Internet Protocol (VoIP) service are applied more and more prevalently. Therefore, communication systems such as Worldwide Interoperability for Microwave Access (WiMAX) network also support the PS domain services like VoIP. From the perspective of service model, the telephone service of VoIP is a local service, that is, only a small portion of VoIP services occurs beyond the local conversation area. Also, service flows of a similar application scenario exist in a communication network, and some of the service flows are switched in the local area. However, as shown in FIG. 1, as regards service flows (such as VoIP) which can implement communication by local switching only, the service flows still need to be transmitted through a backhaul network and a core network.

In the process of implementing the present invention, the inventor finds at least the following problems in the prior art:

As regards service flows that can be switched locally, if they are transmitted through the backhaul network and the core network, much more bandwidth of the backhaul network and the core network is consumed, and the large transmission delay is reduced.

SUMMARY OF THE INVENTION

The embodiments of the present invention provide a method and system for implementing local switching, and therefore, in a communication network, a part of data may be switched locally and transmitted to the destination to save transmission resources.

A method for implementing local switching includes:

after receiving uplink data sent by a sending MS, querying and determining, according to information carried in the uplink data, information about location of a receiving Mobile Station (MS) that is to receive uplink data; and implementing, according to local switching rules that specify a local switching control mode, local switching for data transmitted between the sending MS and the receiving MS after determining, according to the information about location of the receiving MS and information about location of the sending MS, that the data transmitted between the sending MS and the receiving MS meets local switching conditions.

A system for implementing local switching includes:

a location information managing module, adapted to manage information about location of MSs in a communication network;

a local switching rule managing module, adapted to manage local switching rules that specify a local switching control mode; and a local switching control module, adapted to: query, according to information about location of a sending MS and information carried in uplink data sent by the sending MS, MS location information managed by the location information managing module, so as to obtain information about location of a receiving MS; and control, according to the local switching rules managed by the local switching rule managing module, implementation of local switching for data transmitted between the sending MS and the receiving MS after determining that the data transmitted between the sending MS and the receiving MS meets local switching conditions.

A method for implementing local switching includes:

by a local switching enforcement entity, receiving local switching control information sent by a local switching control entity; and detecting packets from a sending MS according to the local switching control information, and sending the packets that meet local switching conditions to a receiving MS directly so as to implement local switching for data transmitted between the sending MS and the receiving MS.

A local switching enforcement entity includes:

a local switching control information receiving module, adapted to receive local switching control information sent by a local switching control entity; and a local switching processing module, adapted to: detect packets from a sending MS according to the local switching control information received by the local switching control information receiving module, and send the packets that meet local switching conditions to a receiving MS directly so as to implement local switching for data transmitted between the sending MS and the receiving MS.

A local switching control entity includes:

a local switching condition judging module, adapted to: determine information about location of a receiving MS according to information carried in a received packet, and judge, according to information about location of the receiving MS and information about location of the sending MS, whether data transmitted between a sending MS and the receiving MS meets local switching conditions; and a local switching control information sending unit, adapted to: send local switching control information to a local switching enforcement entity according to local switching rules after the local switching condition judging module determines that the local switching conditions are met, so as to instruct the local switching enforcement entity to implement local switching according to the local switching control information.

BRIEF DESCRIPTION OF THE DRAWINGS

To describe technical solutions of the present invention more clearly, the following outlines the accompanying drawings involved in the embodiments of the present invention. Apparently, the embodiments described below with reference to accompanying drawings are merely some embodiments, and persons of ordinary skill in the art can derive other drawings from such accompanying drawings without any creative effort.

DETAILED DESCRIPTION OF THE EMBODIMENTS

Figure 1:
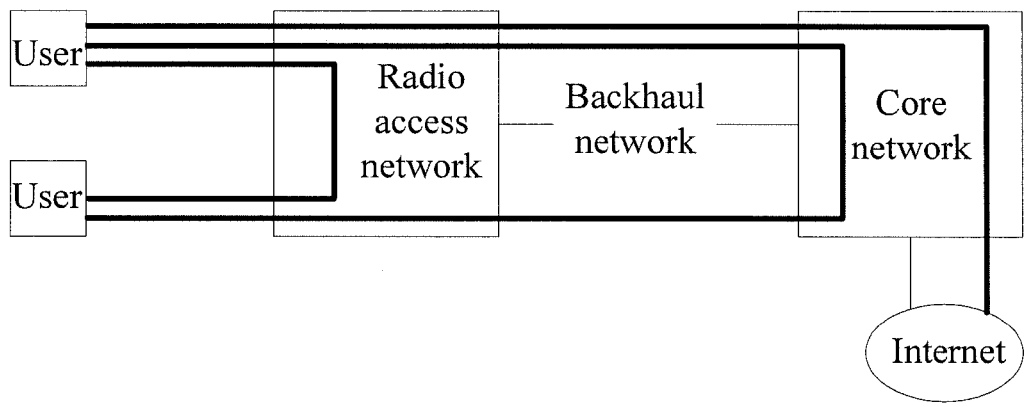
FIG. 1 is a schematic diagram a service flow transmission path in the prior art.

The technical solutions of the present invention are described clearly with the accompanying drawings to provide a thorough understanding of the present invention. Evidently, the drawings and the detailed description are merely part rather than all embodiments of the present invention. All other embodiments, which can be derived by those skilled in the art from the embodiments given herein without any creative effort, shall fall within the protection scope of the present invention.

A technical solution of implementing local switching is provided according to an embodiment of the present invention. In this solution, after uplink data is received from a sending MS, the information about location of the receiving MS that receives the uplink data is determined according to information carried in the uplink data; when it is determined, according to the information about location of the receiving MS and the information about location of the sending MS, that the data transmitted between the sending MS and the receiving MS meets local switching conditions (for example, the communication path of the sending MS overlaps the communication path of the receiving MS in the network), the data transmitted between the sending MS and the receiving MS may be switched locally according to local switching rules that specify a local switching control mode. The information about location of the sending MS is generally known to the entity that makes the local switching decision. For example, the sending MS probably becomes an MS under the entity that makes the local switching decision. In this case, the entity that makes the local switching decision apparently learns the information about location of the sending MS. Alternatively, the entity that makes the local switching decision may determine the information about location of the sending MS through query.

The information about the location may include address information and/or path information, or may be other information so long as the location information clearly identifies whether the data transmitted between two MSs (such as the sending MS and the receiving MS) is met the local switching conditions.

To make the location information available in the process of making the local switching decision, MS location information may be pre-stored in the network, or the MS location information may be learned and updated after the MS accesses the network.

In the embodiments of the present invention, the local switching rules may include local switching subscription information and/or local switching control mode. The local switching subscription information specifies the local switching rule subscribed to by the user, for example, at least one piece of information among local switching information based on the user, local switching information based on service flows, or local switching information based on location. The local switching control mode specifies whether to implement the local switching or at least one of the local switching control patterns. The local switching control pattern may be a centralized control mode or a distributed control mode. In the centralized control mode, one entity makes the local switching decision uniformly; in the distributed control mode, multiple entities make the local switching decision separately.

Figure 2A:
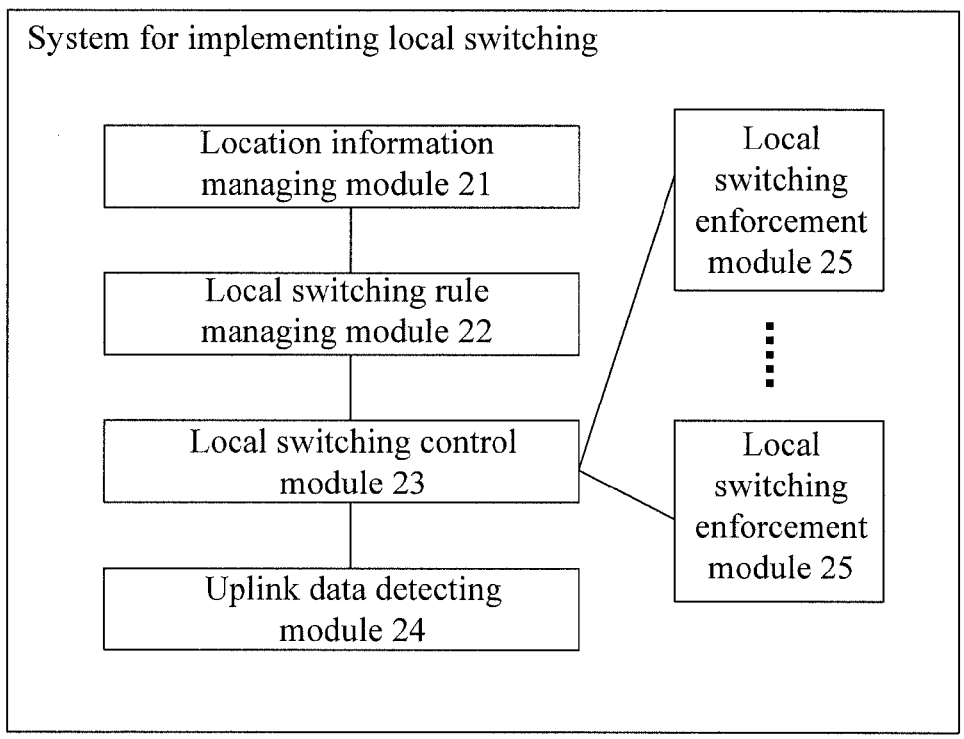
FIG. 2A is a structure diagram of a system according to an embodiment of the present invention.

A system for implementing local switching is provided according to an embodiment of the present invention. As shown in FIG. 2A, the system may include:

a location information managing module 21, adapted to manage information about location of MSs;

a local switching rule managing module 22, adapted to manage local switching rules that specify a local switching control mode; and a local switching control module 23, adapted to: query, according to information about location of a sending MS and information carried in uplink data sent by the sending MS, the MS location information managed by the location information managing module 21 so as to obtain information about location of a receiving MS; and control, according to the local switching rules managed by the local switching rule managing module 22, implementation of local switching for data transmitted between the sending MS and the receiving MS after determining that the data transmitted between the sending MS and the receiving MS meets local switching conditions.

Optionally, the system may further include: an uplink data detecting module 24, adapted to: receive uplink data sent by the sending MS; report a source address of the uplink data to the location information managing module 21 so as to store the sending MS location information indexed by the source address; and report a destination address of the uplink data to the local switching control module 23 so that the local switching control module 23 can use the destination address as an index to search the location information managing module 21 for information about the information about location of the receiving MS.

In this system, the uplink data detecting module may receive classifier information sent by the local switching rule managing module 22, and detect and receive the uplink data according to the classifier information so as to process the source address and the destination address in the uplink data corresponding to only the classifier information. The classifier information carries identifiers of the uplink data that allows local switching. Through the classifier information, the uplink data that needs to be involved in the local switching decision may be identified. In this way, the local switching decision is made for the corresponding uplink data.

In the system provided in this embodiment, when the local switching control module 23 performs, according to the local switching rules managed by the local switching rule managing module 22, local switching for the data transmitted between the sending MS and the receiving MS, the local switching control module 23 may send local switching control information, which is generated according to the local switching rules, to the local switching enforcement module 25. The local switching module enforcement module 25 performs, according to the local switching control information, local switching for the data transmitted between the sending MS and the receiving MS. One or more local switching enforcement modules 25 may exist, and multiple local switching enforcement modules 25 may be set in different entities separately.

In the system for implementing local switching, the location information managing module 21 and the local switching control module 23 may be set in a first entity, and the local switching rule managing module 22 may be set in a second entity. The first entity is different from the second entity. Alternatively, the location information managing module 21, the local switching rule managing module 22 and the local switching control module 23 may be set in different entities separately or may be set in the same entity (such as the first entity). Optionally, the uplink data detecting module 24 may be set in the first entity, or set in one or more entities independently, or may be set together with the location information managing module 21, local switching rule managing module 22 and local switching control module 23 in the same entity. Accordingly, the local switching enforcement module 25 may be set in the first entity, or set in one or more entities independently, or may be set together with the location information managing module 21, local switching rule managing module 22 and local switching control module 23 in the same entity.

It should be noted that, from the perspective of the logical entity to describe classification of the processing functions correspondingly, the location information managing module 21, local switching rule managing module 22, local switching control module 23, uplink data detecting module 24 and local switching enforcement module 25 may be called: location information managing entity, local switching rule managing entity, local switching control entity, uplink data detecting entity and local switching enforcement entity respectively.

Through the method and system provided above, the local switching may be implemented in the communication network, so as to save network transmission resources, shorten the delay of data transmission, and improve efficiency of data transmission. That is, local switching may be implemented for data transmission when the data paths of two communication parties (sending MS and receiving MS) overlap.

In the local switching solution provided in this embodiment, the local switching may be implemented according to different control granularities, so as to meet different local switching requirements.

For example, if the local switching is controlled according to the local granularity, the user may enjoy local switching by accessing a radio network in a specific area. Specifically, access network devices may be preset in specific areas to enable local switching control based on the local granularity.

If the local switching is controlled according to the user granularity, the user subscribes to the local switching beforehand or the radio network service provider controls, according to the operator policy, whether the user is entitled to the local switching. If the user is entitled to the local switching, all local switching services of the user may be transmitted in the local switching mode.

If the local switching is controlled according to the service granularity, the user subscribes to the local switching beforehand or the radio network service provider controls, according to the operator policy, which services may be implemented through local switching, and therefore, specific services may be allowed to be transmitted in the local switching mode.

The local switching of different control granularities may be configured flexibly according to actual application scenarios and requirements, so that local switching may be controlled hierarchically.

In this embodiment, the local switching may be controlled in different patterns. That is, in a radio network, the local switching control point (namely, an entity on which a local switching control module is set) may be set in a specific network element in the network, or may be located on each data-plane network element. Therefore, two local switching control patterns are included as follows:

(1) Centralized Control Mode

In the centralized control mode, the local switching control point is set on a specific network element (such as gateway (GW) or Network Access Server (NAS)). The specific network element determines the corresponding local switching enforcement point (an entity on which a local switching enforcement module is set) through real-time data detection, determines the local switching enforcement parameters according to the local switching policy (namely, local switching rule), and notifies the local switching enforcement parameter to the local switching enforcement point, so as to make the local switching enforcement point perform the local switching. For example, if the GW detects the uplink data and determines that the two communication Mobile Stations (MSs) are under the same Base Station (BS), the GW instructs the BS to initiate local switching for the services of the two MSs.

(2) Distributed Control Mode

In the distributed control mode, the local switching control point is set on different network elements (such as BS, serving GW, anchor GW or NAS) of the data plane, and different network elements distributed on the data plane detect the data. The local switching may be performed if the data paths of the two communication parties overlap.

Figure 2B:
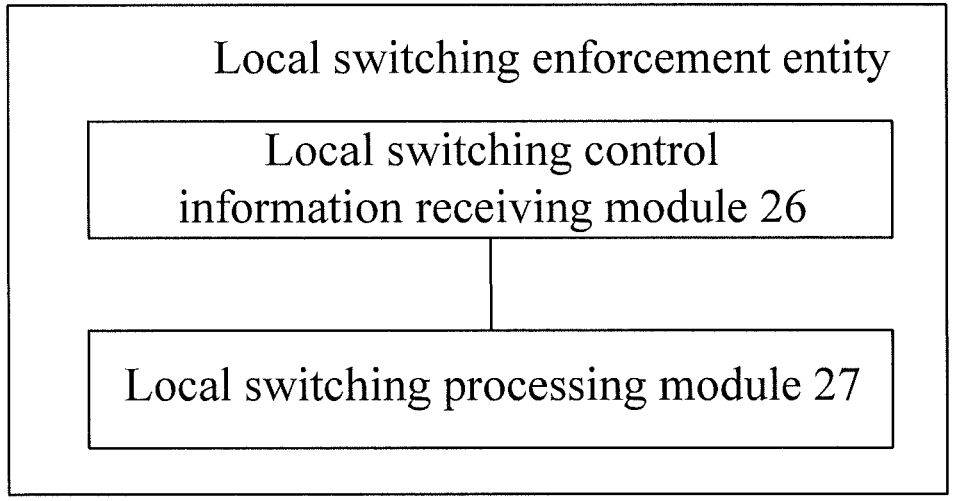
FIG. 2B is a structure diagram of a local switching enforcement entity according to an embodiment of the present invention.

A local switching enforcement entity is provided according to an embodiment of the present invention. As shown in FIG. 2B, the local switching enforcement entity may include:

a local switching control information receiving module 26, adapted to receive local switching control information sent by a local switching control entity, where the local switching control information is determined according to the local switching rules; and a local switching processing module 27, adapted to: detect packets from a sending MS according to the local switching control information received by the local switching control information receiving module 26, and send the packets that meet local switching conditions to a receiving MS directly so as to implement local switching for data transmitted between the sending MS and the receiving MS.

Figure 2C:
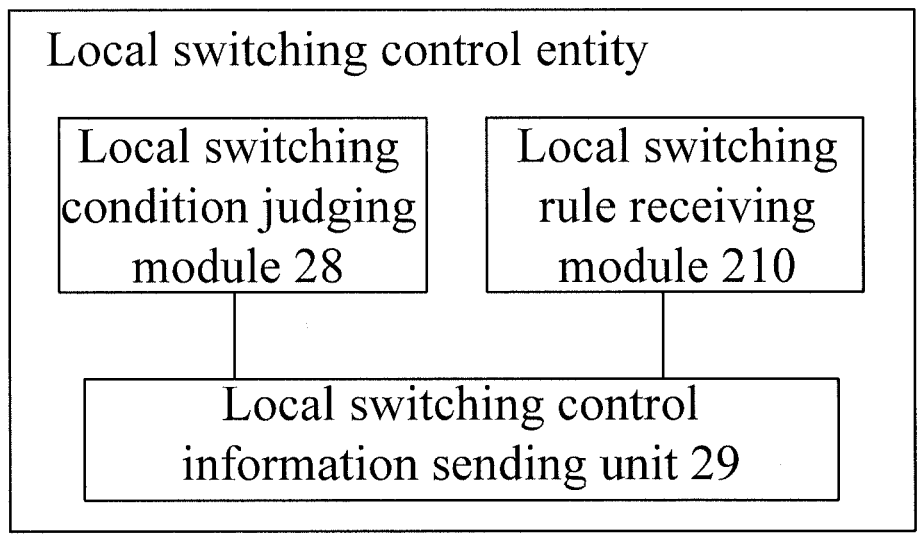
FIG. 2C is a structure diagram of a local switching control entity according to an embodiment of the present invention.

A local switching control entity is provided according to an embodiment of the present invention. As shown in FIG. 2C, the local switching control entity may include:

a local switching condition judging module 28, adapted to: query and determine information about location of a receiving MS according to information carried in a received packet, and determine according to the information about location of the receiving MS and information about location of the sending MS, whether data transmitted between a sending MS and the receiving MS meets local switching conditions; and a local switching control information sending unit 29, adapted to: send local switching control information to a local switching enforcement entity according to local switching rules after the local switching condition judging module 28 determines that the local switching conditions are met, so as to instruct the local switching enforcement entity to implement, according to the local switching control information, local switching, where the local switching control information is determined according to the local switching rules.

Optionally, the local switching control entity may further include a local switching rule receiving module 210, which is adapted to receive local switching rules sent by the local switching rule managing entity and determine, according to the local switching rules, the mode and entity of performing the local switching. The local switching rules include local switching subscription information and/or local switching control mode. The local switching subscription information specifies the rules, which are subscribed to by the user, for performing the local switching. The local switching control mode specifies whether to perform the local switching or at least one of the local switching control patterns. The local switching control pattern may include a centralized control mode or a distributed control mode. In the centralized control mode, one entity makes the local switching decision uniformly; in the distributed control mode, multiple entities make the local switching decision separately. The local switching rules subscribed to by the user include but are not limited to: at least one piece of information among local switching information based on the user, local switching information based on service flows, or local switching information based on location.

To make embodiments of the present invention understandable, the following gives details about the implementation process of the embodiments of the present invention with reference to accompanying drawings.

Embodiment 1

Figure 3A:
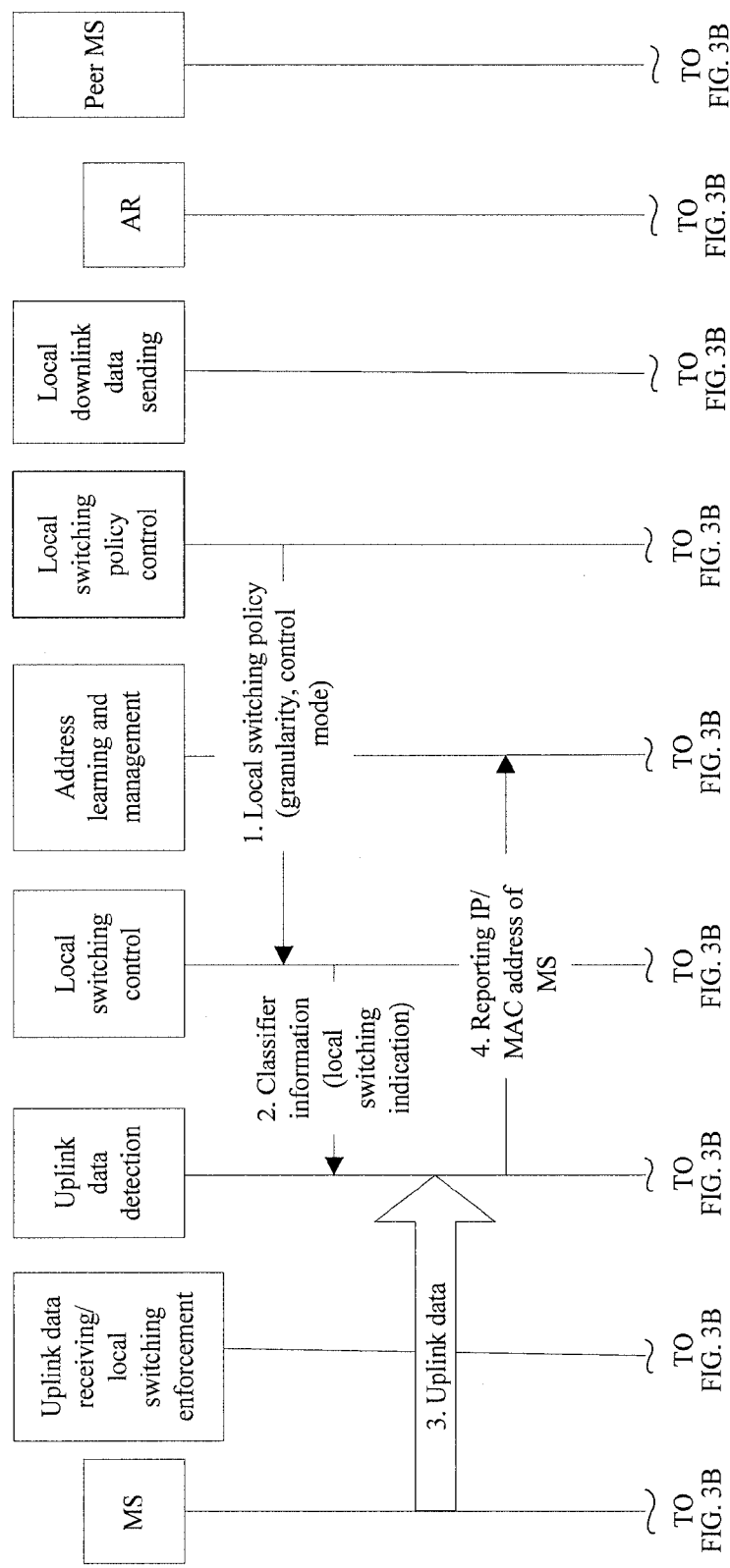
FIG. 3 is a schematic diagram of a processing procedure according to a first embodiment of the present invention.
Figure 3B:
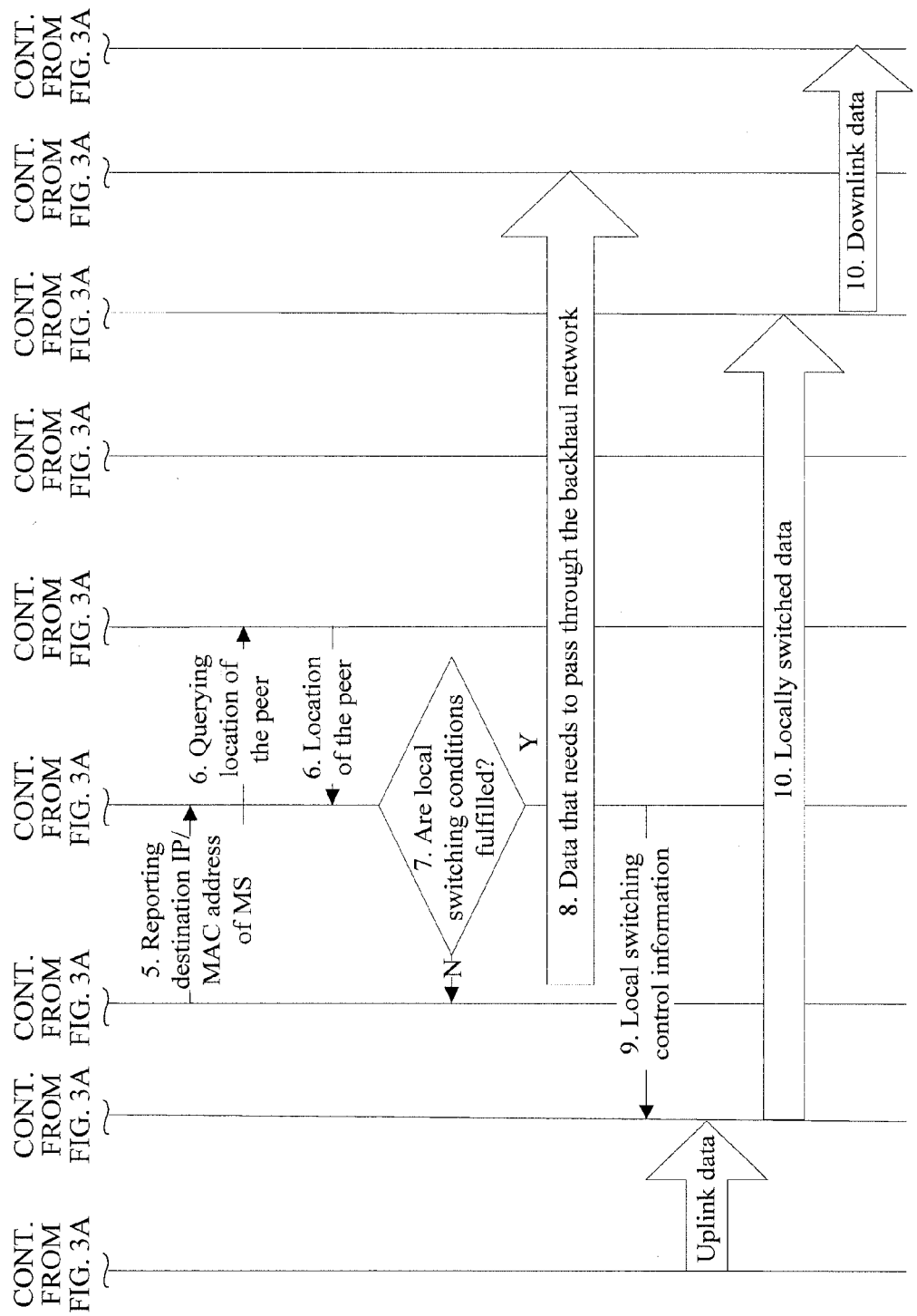

As shown in FIG. 3, the process of performing local switching in this embodiment includes the following steps:

Step 1: A local switching (LS) policy control module (namely, local switching rule managing module) notifies the local switching policy (namely, local switching rule) to the local switching control module.

Specifically, the local switching policy control module may notify the applicable local switching policy to the local switching control module according to the received or preset local switching policy (such as location-based local switching policy). The local switching policy may include: local switching control pattern (such as centralized control mode or distributed control mode) and local switching granularity (for example, controlling the local switching based on the location granularity, user granularity, or service flow granularity).

Step 2: The local switching control module instructs the uplink data detecting module to execute the data detection policy after receiving the local switching policy.

Specifically, by sending classifier information to the uplink data detecting module, the local switching control module instructs the uplink data detecting module to detect the uplink data according to the classifier information. The classifier information may include: a local switching indication which indicates whether to perform local switching, and information which indicates that it is required to perform uplink data detection for a specific user or service flow.

Step 3: The MS sends uplink data to the uplink data detecting module.

Optionally, the uplink data may arrive at the uplink data detecting module after passing through one or more uplink data receiving modules.

Step 4: The uplink data detecting module resolves Internet Protocol (IP) packets or Media Access Control (MAC) packets to obtain the source IP address or source MAC address, and sends the source IP address or source MAC address to an address learning and managing module (namely, location information managing module). The location learning and managing module learns or updates the address information of the MS, and therefore, the local switching control module may find the address information when the MS serves as a destination.

Step 4 is not limited to be performed before step 5, but may be performed at other step after step 5.

Step 5: The uplink data detecting module resolves the IP packets or MAC packets to obtain the destination IP address or destination MAC address, and notifies the destination IP address or destination MAC address to the local switching control module.

Step 6: The local switching control module searches the address learning and managing module for the location of the communication peer, that is, searches, according to the IP address or MAC address, the access station and GW that serve the peer MS.

Step 7: The local switching control module judges, according to the location of the communication peer, whether the paths of the two communication parties overlap and whether the local switching conditions are met.

Step 8: If determining that the local switching conditions are not met, the local switching control module instructs the uplink data detecting module to send the uplink data to an Access Router (AR), and the data is transmitted to the peer MS through the backhaul network and the core network.

Step 9: If determining that the local switching conditions are met, the local switching control module searches a proper uplink data receiving module and a proper local downlink data sending module according to the local switching policy and the communication path between the two MSs, and instructs the uplink data receiving module to get associated with the local downlink data sending module on the communication peer.

Specifically, by sending the local switching control information to the uplink data receiving module, the local switching control module instructs the uplink data receiving module to perform local switching for the received uplink data that meet the local switching conditions. The local switching control information may include information about service flows that require local switching, information about destination address of the packet, or user information (for example, source address information of the packet, or other identifiers that uniquely identify users). According to the local switching control information, the uplink data receiving module may locally record, according to the local switching control information, the feature information of the packets that meet local switching conditions. If the destination IP address or MAC address of a packet is a specific communication node, the local switching conditions are met, and the packet may be sent directly to the associated local downlink data sending module.

Step 10: On a local switching enforcement point that includes the local switching enforcement module, after receiving the uplink data, the uplink data receiving module directly sends the uplink data, which meet the local switching conditions according to the local switching control information, to the associated local downlink data sending module. The local downlink data sending module sends the data to the peer MS directly, so as to implement local switching.

Specifically, a data detecting function may be enabled in the uplink data receiving module, and the data compliant with local switching rules is sent to the peer MS directly according to the local switching rules.

Taking the local switching in a WiMAX network as an example, the following describes the detailed process of local switching implemented in the WiMAX network with reference to accompanying drawings.

The WiMAX network is an IEEE 802.16-based radio Metropolitan Area Network (MAN). The WiMAX network includes an MS, a Subscriber Station (SS), an Access Service Network (ASN), and a Connection Service Network (CSN). The ASN includes a BS and an ASN GW; and the CSN includes a Prepaid Service (PPS) server and an Authentication Authorization Accounting (AAA) server. The transmission cost on the backhaul network may be saved if the local switching is performed on the anchor ASN GW, serving ASN GW, BS and Relay Station (RS) in the WiMAX network.

Embodiment 2

In this embodiment, if the local switching is performed in a centralized control mode, the local switching may be controlled on an authenticator GW, and the local switching may be performed on the BS, RS, or ASN GW.

Figure 4A:
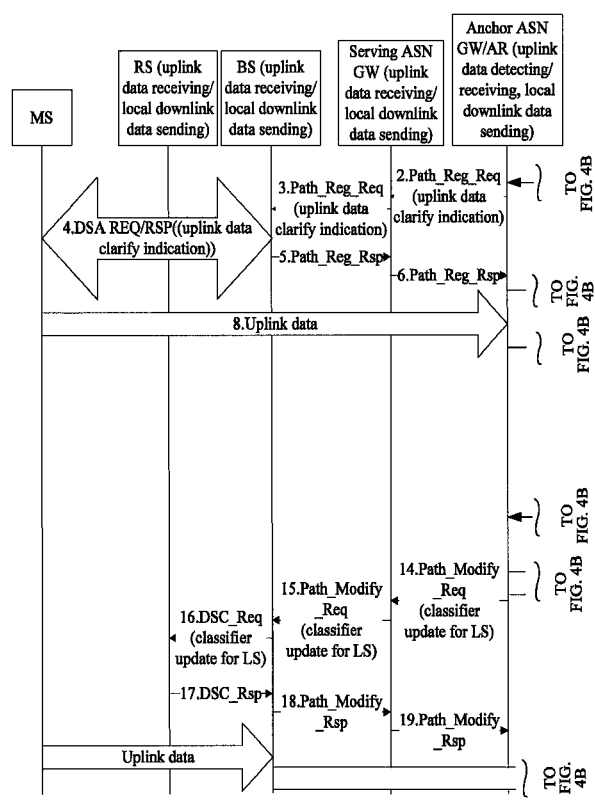
FIG. 4 is a schematic diagram of a processing procedure according to a second embodiment of the present invention.
Figure 4B:
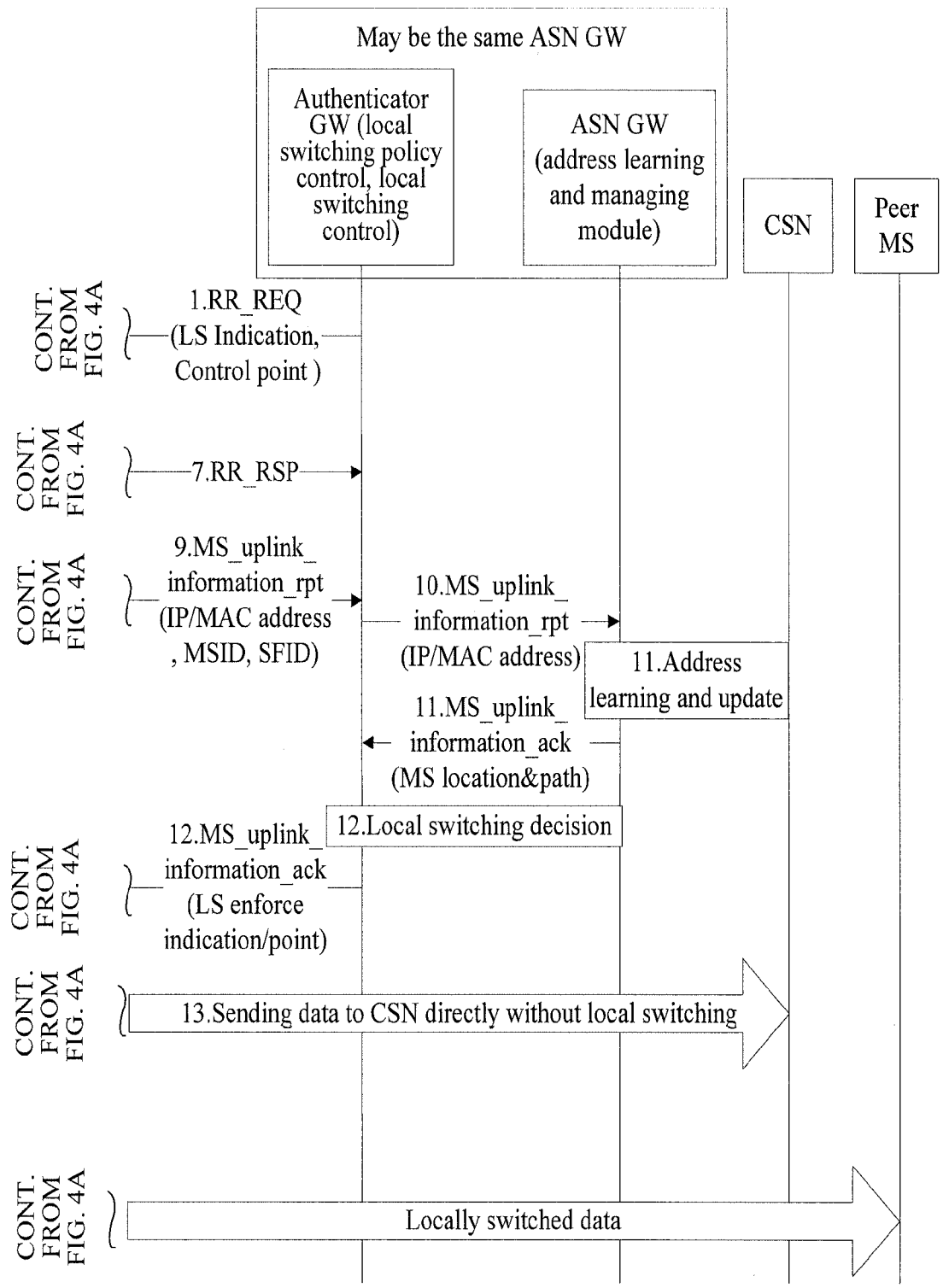

As shown in FIG. 4, the process of performing local switching may include the following steps:

Step 1: An Anchor Service Flow Authorization (SFA) entity located in an authenticator GW (namely, GW of an authenticator) sends a Resource Reservation Request (RR_Req) message to a serving SFA located in an anchor ASN GW. The message carries the local switching policy (namely, local switching rule) which is determined according to the local subscription information of the MS and the preset local switching control mode.

The local switching subscription information may be local switching subscription information based on service flows or users, or location-based local switching preset information. The local switching control mode may be a centralized control mode (or distributed control mode) and may specify whether to enforce location-based local switching.

Specifically, in the process of MS access authentication, the authenticator receives local switching subscription information from the MS served by the AAA server, and triggers, according to the local switching control mode configured locally, an anchor SFA to set up service flows of the MS, where the anchor SFA is located in the ASN GW of the authenticator. That is, the authenticator sends an RR_Req message to the serving SFA entity located in the anchor ASN GW. The RR_Req message includes a local switching (LS) indication and the corresponding local switching control point. Further, for the local switching based on service flows, a local switching indication and the corresponding local switching control point (such as a RS, BS or ASN GW) may be added into information about the service flows which support local switching, where the information about the service flows is included in the RR_Req message. For the local switching based on the location or users, a local switching indication and the corresponding local switching control point may be added into information about all service flows of the user, where the information about all service flows of the user is included in the RR_Req message.

Step 2: The serving SFA receives the RR_Req message, and sends a Path Registration Request (Path_Reg_Req) message to the serving ASN GW to set up the corresponding service flow and data path. According to the location of the local switching control point, an uplink data clarify indication may be added in the Path_Reg_Req message.

Step 3: The serving ASN GW SFA receives the Path_Reg_Req message, and sends the Path_Reg_Req message to the BS to set up the corresponding service flow and data path.

Step 4: The BS receives the Path_Reg_Req message, and sends a Dynamic Service Addition Request (DSA_Req) message to the MS to set up an air interface connection that bears service flows. Optionally, the DSA_Req message may pass through a RS before arriving at the MS. According to the location of the local switching control point, an uplink data clarify indication may be added in the DSA_Req message.

The MS receives the DSA_Req message, and sends a Dynamic Service Addition Response (DSA_Rsp) message to the BS in response to the DSA_Req message. Optionally, the DSA_Rsp message passes through a RS before arriving at the BS.

Step 5: The BS receives the DSA_Rsp message which serves as a response message, and sends a Path Registration Response (Path_Reg_Rsp) message to the serving ASN GW in response to the Path_Reg_Req message.

Step 6: The serving ASN GW receives the Path_Reg_Rsp message, and sends a Path_Reg_Rsp message to the serving SFA.

Step 7: The serving SFA receives the Path_Reg_Rsp message, and sends a Resource Reservation Response (RR_Rsp) message to the anchor SFA in response to the RR_Req message.

Step 8: The MS sends uplink data to the anchor GW on the corresponding service flow when the uplink data needs to be sent.

Step 9: The anchor GW determines that the service flow supports local switching. Therefore, an anchor Data Path Function (DPF) in the anchor DPF sends an MS uplink information report (MS_uplink_information_rpt) message to the authenticator. The MS_uplink_information_rpt message may include: an MS Identifier (MSID), a Service Flow ID (SFID), an IP/MAC address of the MS and an IP/MAC address of the communication peer (for the IP Convergence Sublayer (CS), the message includes an IP address; for Ethernet CS, the message includes a MAC address), and a path of the MS. For example, the path of the MS includes the ID of the RS of the MS, ID of the BS, and ID of the ASN GW along the path. The MSID and/or the IP/MAC address of the MS may be included. The SFID and/or the MS path may be included.

Step 10: The authenticator receives the MS_uplink information_rpt message, and sends the message to the address learning and managing module.

Step 11: The address learning and managing module receives the MS_uplink_information_rpt message, records the IP/MAC address of the MS and the current location of the MS and the MS path (for example, ID of the RS of the MS, ID of the BS, and ID of the ASN GW on the path), and sends an MS uplink information acknowledgement (MS_uplink_information_ack) message to the authenticator. The message may include the current location and path of the MS.

In this step, the location of the communication peer (the location of the communication peer may be indicated by BS ID or RS ID of the communication peer, and if the access station of the MS is RS, it is required to determine the RS ID of the communication peer) and the data path of the MS in the ASN (the data path may be indicated by the ID of the ASN GW on the data path of the MS, namely, current location and path of the MS) may be found out according to the IP/MAC address of the communication peer to determine a first overlap point.

Alternatively, the first overlap point may be determined according to the paths of the MS and the communication peer in the ASN (specifically, the first overlap point may be determined in the following path: RS→BS→serving ASN GW→anchor ASN GW). In this case, the MS_uplink_information_ack message may directly include the first overlap point rather than the current location and path of the MS.

Step 12: From the received MS_uplink_information_ack message, the authenticator retrieves information about the current location and path of the MS or directly obtains information about the first overlap point.

If the authenticator retrieves the information about the current location and path of the MS from the MS_uplink_information_ack message, the authenticator needs to determine the first overlap point of the MS and the communication peer (the first overlap point may be determined in the following path: RS→BS→serving ASN GW→anchor ASN GW). Afterward, the authenticator determines the local switching enforcement parameters according to the local switching subscription information and the local switching control mode of the MS, and sends an MS_uplink_information_ack message to the anchor DPF. The message includes the local switching enforcement parameter. The local switching enforcement parameter indicates whether to perform local switching, and, if local switching is performed, indicates the local switching enforcement point and classifier information.

Step 13: After the anchor DPF receives the MS_uplink_information_ack message, if it is determined that local switching is not performed, the uplink data is routed to a CSN as usual.

Step 14: After the anchor DPF receives the MS_uplink_information_ack message, if it is determined that local switching is performed:

If the local switching enforcement point is the anchor DPF, the anchor DPF updates the local classifier according to the delivered local switching enforcement parameters; for the data that meets local switching conditions, for example, packets whose destination IP/MAC address meets the local switching conditions, packets of a user that require local switching, or packets of a service flow that require local switching, the data is sent to the downlink data path of the communication peer directly; or If the local switching enforcement point is not the anchor DPF, the anchor DPF sends a Path_Modify_Req message to the serving ASN GW, where the message includes information about the local switching enforcement point and information about the classifier that needs to be updated for performing local switching.

Step 15: After the serving ASN GW receives the Path_Modify_Req message, if it is determined that local switching is performed:

If the local switching enforcement point is the serving ASN GW, the serving ASN GW updates the local classifier according to the delivered local switching enforcement parameters; for the data that meets local switching conditions, for example, packets whose destination IP/MAC address meets the local switching conditions, packets of a user that require local switching, or packets of a service flow that require local switching, the data is sent to the downlink data path of the communication peer directly; or If the local switching enforcement point is not the serving ASN GW, the serving ASN GW sends a Path_Modify_Req message to the BS, where the message includes information about the local switching enforcement point and information about the classifier that needs to be updated for performing local switching.

Step 16: After the BS receives the Path_Modify_Req message, if it is determined that local switching is performed:

If the local switching enforcement point is the BS, the BS updates the local classifier according to the delivered local switching enforcement parameters; for the data that meets local switching conditions, for example, packets whose destination IP/MAC address meets the local switching conditions, packets of a user that require local switching, or packets of a service flow that require local switching, the data is sent to the downlink air interface connection of the communication peer directly; or If the local switching enforcement point is not the BS, the BS sends a Dynamic Service Change Request (DSC_Req) message to the RS, where the message includes information about the local switching enforcement point and the parameter of the classifier that needs to be updated for performing local switching.

Step 17: The RS receives the DSC_Req message, and updates the local classifier according to the delivered local switching enforcement parameters; for the data that meets local switching conditions, for example, packets whose destination IP/MAC address meets the local switching conditions, packets of a user that require local switching, or packets of a service flow that require local switching, the data is sent to the downlink air interface connection of the peer directly. Moreover, the RS returns a Dynamic Service Change Response (DSC_Rsp) message to the BS.

Step 18: The BS sends a Path_Modify_Rsp message to the serving ASN GW in response to the Path_Modify_Req message.

Step 19: The serving ASN GW receives the Path_Modify Rsp message, and sends the corresponding Path_Modify_Rsp message to the anchor ASN GW in response to the Path_Modify_Req message.

Through the foregoing process, the local switching is performed. FIG. 4 only shows the process of transmitting uplink data when the BS serves as a local switching enforcement point, namely, when the BS sends the locally switched data to communication the peer MS directly after receiving the uplink data.

By using the BS as a local switching enforcement point, with the local switching technology, the service is processed locally for the same MSs under the same BS or same group of BSs, on the basis of the access location of the MS. In this way, the mobile communication traffic bypasses the backhaul network from the radio BS to the closest switching node, and the connection is set up at the BS directly to perform local communication, so as to save network transmission resources.

Embodiment 3

In this embodiment, the local switching is performed in a centralized control mode. Specifically, the local switching may be controlled at the anchor ASN GW, and may be performed at the BS, RS, or ASN GW.

Figure 5A:
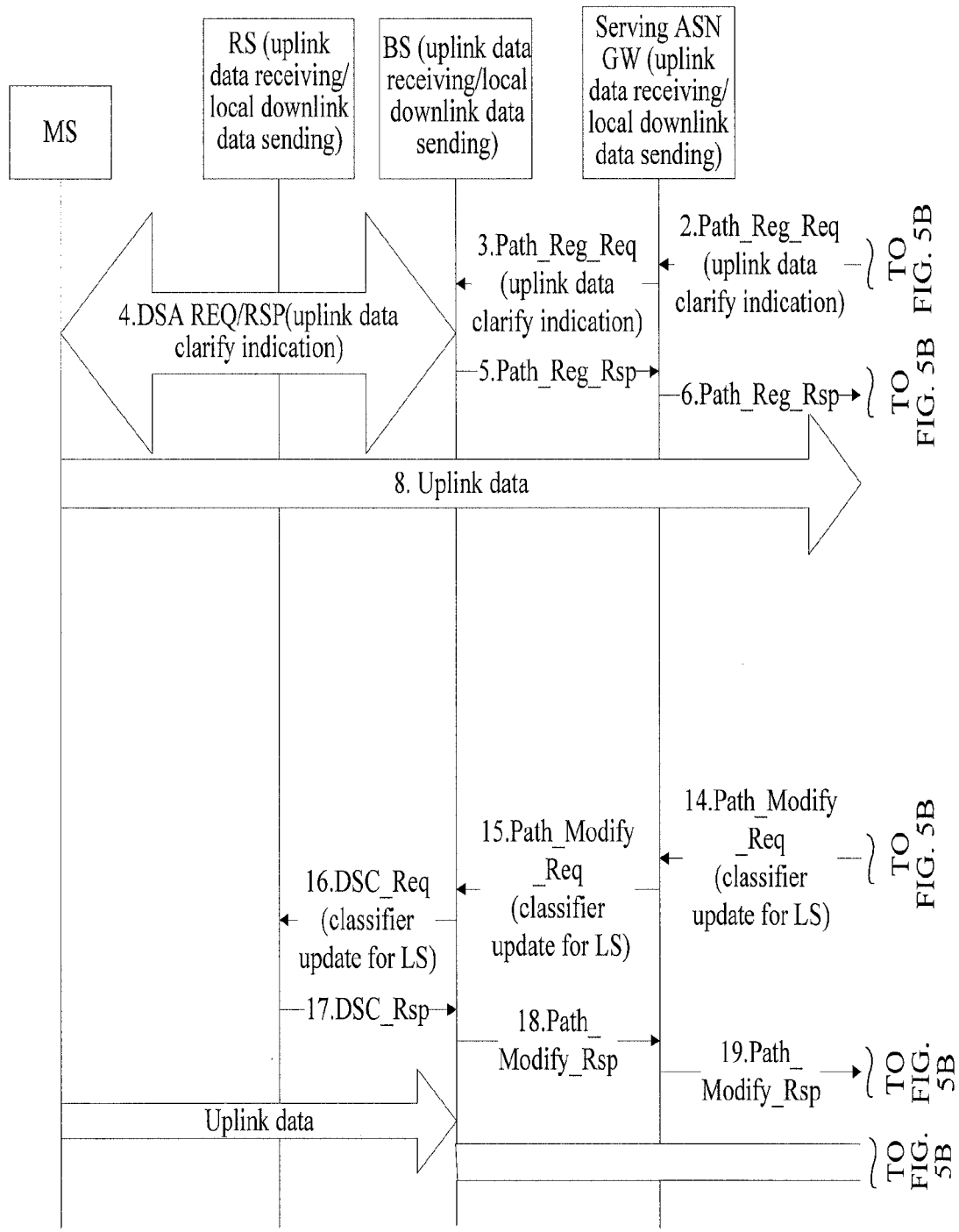
FIG. 5 is a schematic diagram of a processing procedure according to a third embodiment of the present invention.
Figure 5B:
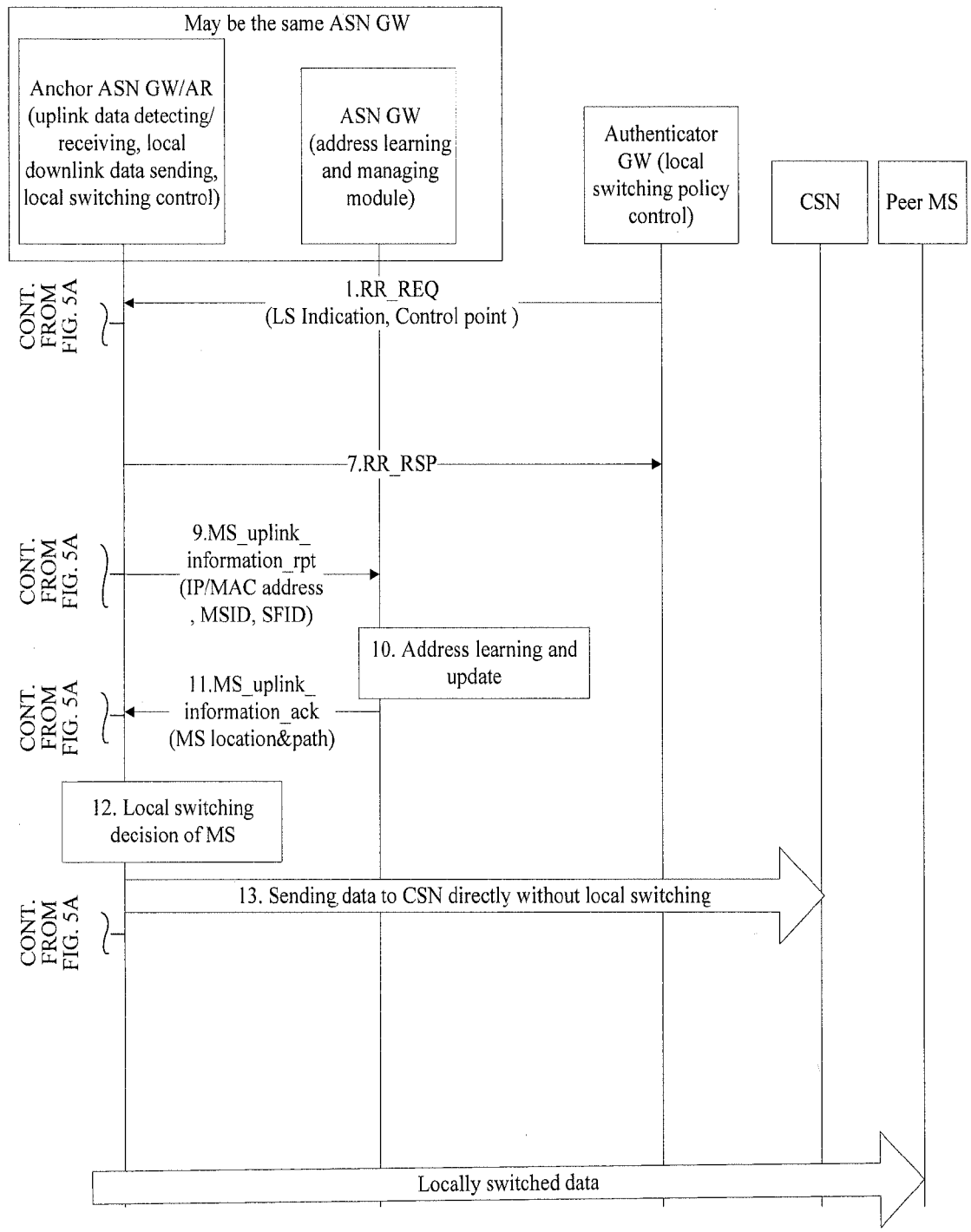

As shown in FIG. 5, the process of performing local switching may include the following steps:

Steps 1-8 in this embodiment are the same as steps 1-8 in the second embodiment above, and details will not be described herein again.

Step 9: After the anchor ASN GW receives the uplink data, if the service flow supports local switching, the anchor DPF in the anchor ASN GW sends an MS_uplink_information_rpt message to the address learning and managing module. The message includes: MSID, SFID, IP/MAC address of the MS, IP/MAC address of the communication peer (for IP CS, the message includes the IP address; for Ethernet CS, the message includes the MAC address), and MS path (for example, ID of the RS of MS, ID of the BS, and ID of the ASN GW on the path).

Step 10: The address learning and managing module records the IP/MAC address of the MS and the MS path so that other entities can query the corresponding information when making the local switching decision.

Step 10 is not limited to be performed before step 11, and can be performed at other step after step 11.

Step 11: The address learning and managing module may find the path of the communication peer (the path of the peer is indicated by the BSID of the BS of the communication peer and/or the RSID of the RS of the communication peer. If the access station of the MS is the RS, the path of the peer may include the corresponding RSID) and the path of the MS in the ASN (for example, ID of the ASN GW on the path of the MS) according to the IP/MAC address of the communication peer. Alternatively, the address learning and managing module determines a first overlap point (the first overlap point is determined in the following path: RS→BS→serving ASN GW→anchor ASN GW) according to the paths of the MS and the communication peer in the ASN. Moreover, the address learning and managing module sends an MS_uplink_information_ack message to the anchor DPF. This message includes the path of the communication peer, and the path of the MS in the ASN or the determined first overlap point.

Step 12: After the anchor DPF receives the MS_uplink_information_ack message, the anchor DPF determines the first overlap point of the MS path and the communication peer path (the first overlap point is determined in the following path: RS→BS→serving ASN GW→anchor ASN GW) according to the communication peer path and the path of the MS in the ASN. Alternatively, the anchor DPF obtains the first overlap point from the MS_uplink_information_ack message directly, and determines the local switching enforcement parameter according to local switching subscription information and the local switching control mode of the MS. The local switching enforcement parameter indicates whether to perform local switching, and, if local switching is performed, indicates the local switching enforcement point and classifier information.

Step 13: The uplink data is routed to the CSN as usual if the anchor DPF decides not to perform local switching.

Step 14: If the anchor DPF decides to perform local switching:

If the local switching enforcement point is the anchor DPF, the anchor DPF updates the local classifier according to the local switching enforcement parameters; for the data that meets local switching conditions, for example, packets whose destination IP/MAC address meets the local switching conditions, packets of a user that require local switching, or packets of a service flow that require local switching, the anchor DPF sends the data to the downlink data path of the peer directly; or If the local switching enforcement point is not the anchor DPF, the anchor DPF sends a Path_Modify_Req message to the serving AS GW, where the message includes information about the local switching enforcement point and information about the classifier that needs to be updated for performing local switching.

Steps 15-19 in this embodiment are the same as steps 15-19 in the second embodiment above, and details will not be described herein again.

Through the foregoing process, the local switching is performed. FIG. 5 only shows the process of transmitting uplink data when the BS serves as a local switching enforcement point, namely, when the BS sends the locally switched data to the peer MS directly after receiving the uplink data.

Embodiment 4

In this embodiment, the local switching is performed in a distributed control mode. Specifically, the local switching may be performed at the ASN GW, BS or RS, and the local switching may be decided on the ASN GW, BS or RS respectively so as to determine whether to perform the local switching. The corresponding addresses can still be maintained and managed in a centralized way, namely, managed in the address learning and managing module in a centralized way.

Figure 6A:
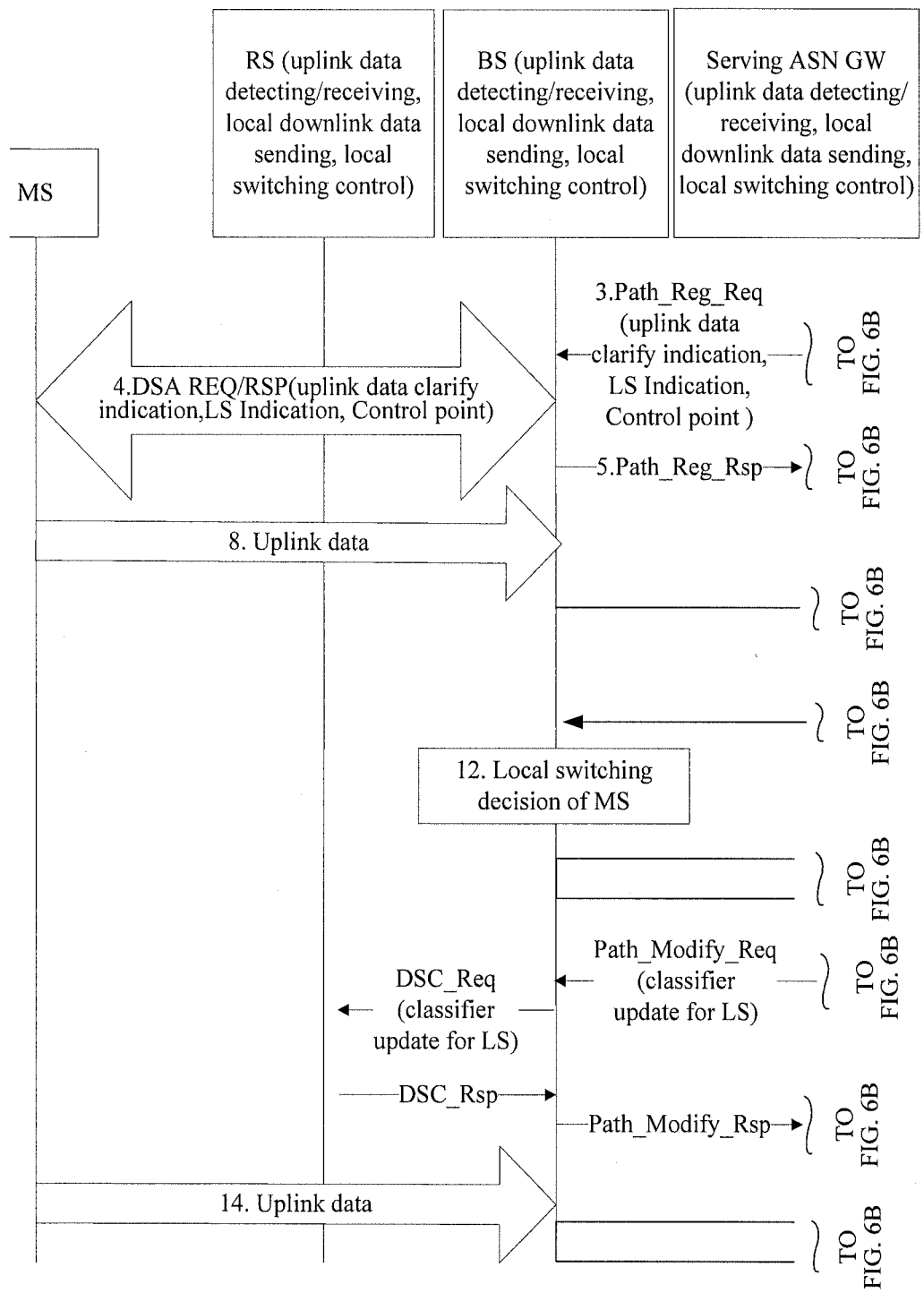
FIG. 6 is a first schematic diagram of a processing procedure according to a fourth embodiment of the present invention.
Figure 6B:
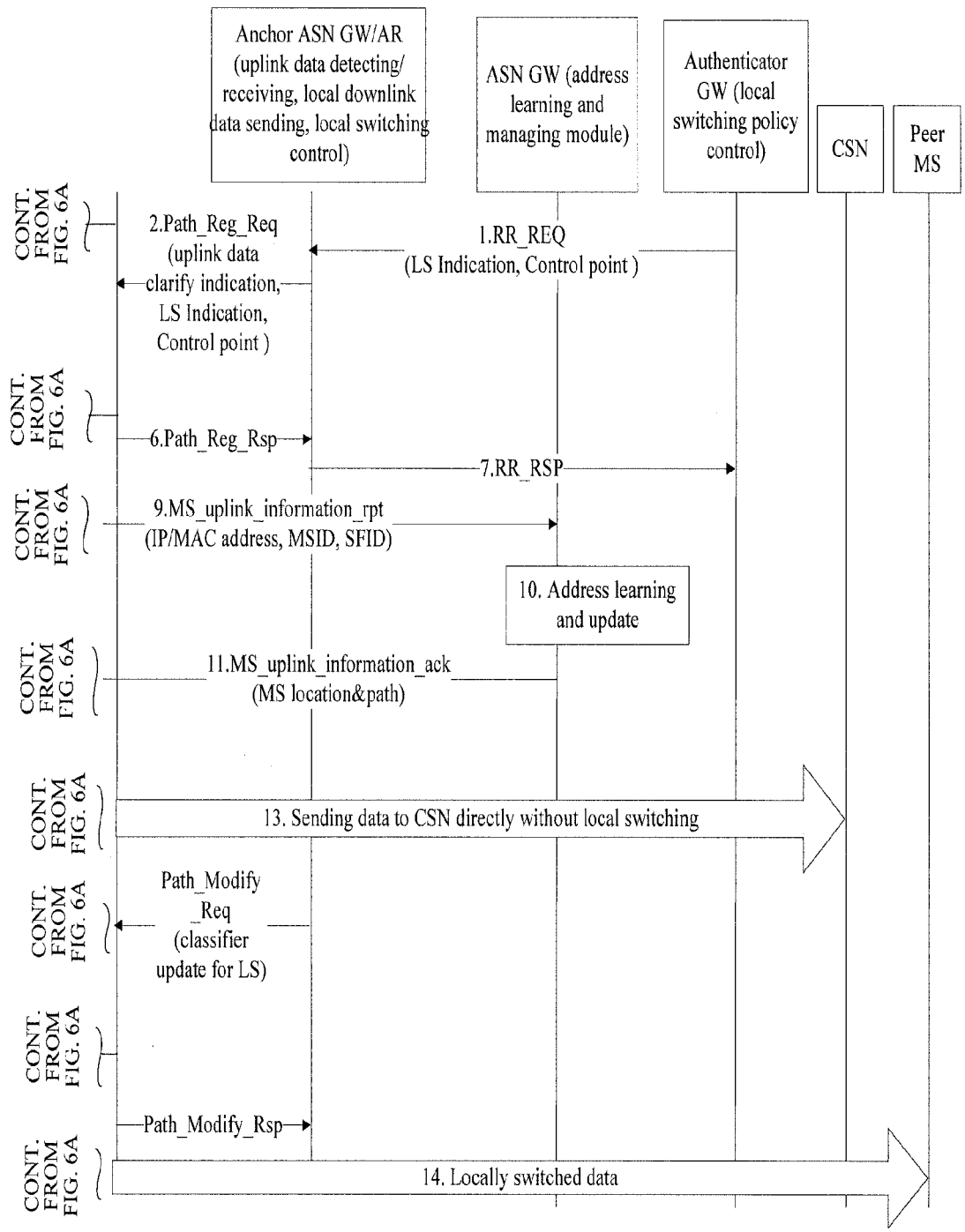

As shown in FIG. 6, the process of performing local switching may include the following steps:

Step 1: An authenticator sends an RR_Req message to a serving SFA located in an anchor DPF. The message includes a local switching policy such as a local switching indication and a local switching control point. The local switching policy is determined according to local subscription information of an MS and the preset local switching control mode.

The local switching subscription information may be based on service flows, users, or location; and the local switching control mode may be a distributed control mode (or a centralized control mode) and may specify whether to enforce location-based local switching.

Specifically, in the process of MS access authentication, the authenticator receives local switching subscription information from the MS served by the AAA server, and triggers, according to the local switching control mode configured locally, an anchor SFA to set up service flows of the MS, where the anchor SFA is located in the ASN GW of the authenticator. That is, the authenticator sends an RR_Req message to the serving SFA entity located in the anchor DPF. The RR_Req message includes a local switching indication and the corresponding local switching control point. Further, for the local switching based on service flows, a local switching indication and the corresponding local switching control point (such as RS, BS or ASN GW) may be added into information about the service flows which support local switching, where the information about the service flows is included in the RR_Req message. For the local switching based on location or users, a local switching indication and the corresponding local switching control point may be added into information about all service flows of the user, where information about all service flows is included in the RR_Req message.

Step 2: The serving SFA receives the RR_Req message, and sends a Path_Reg_Req message to the serving GW to set up the corresponding service flow and data path. A local switching indication and the corresponding local switching control point information need to be added into the Path_Reg_Req message.

Step 3: The serving ASN GW receives the Path_Reg_Req message, and sends the Path_Reg_Req message to the BS to set up the corresponding service flow and data path. A local switching indication and the corresponding local switching control point information need to be added into the Path_Reg_Req message.

Step 4: The BS receives the Path_Reg_Req message, and sends a DSA_Req message to the MS to set up an air interface connection that bears the service flow. Optionally, the DSA_Req message passes through the RS before arriving at the MS. After receiving the DSA_Req message, the MS sends a DSA_Rsp message in response to the DSA_Req message. Optionally, the DSA_Rsp message passes through the RS before arriving at the BS.

In the scenario with an RS, a local switching indication and the corresponding local switching control point information may be added into the DSA_Req message sent to the RS.

Step 5: The BS receives the DSA_Rsp message, and sends a Path_Reg_Rsp message to the serving ASN GW in response to the Path_Reg_Req message.

Step 6: The serving ASN GW receives the Path_Reg_Rsp message, and sends a Path_Reg_Rsp message to the serving SFA in response to the Path_Reg_Req message.

Step 7: The serving SFA receives the Path_Reg_Rsp message, and sends an RR_Rsp message to the anchor SFA in response to the RR_Req message.

Step 8: The MS sends uplink data on the corresponding service flow when the uplink data needs to be sent.

Step 9: If the service flow supports local switching, the RS, BS, or ASN GW detects the uplink data streams of the MS, and sends an MS_uplink_information_rpt message to the address learning and managing module. The message includes: MSID, SFID, IP/MAC address of the MS, IP/MAC address of the communication peer (for IP CS, the message includes the IP address; for Ethernet CS, the message includes the MAC address).

Step 10: The address learning and managing module records (namely, learns and updates) the IP/MAC address of the MS so that other entities may query the corresponding information when making the local switching decision.

Step 10 is not limited to be performed before step 11, and may be performed at other step after step 11.

Step 11: The address learning and managing module, according to the PP/MAC address of the peer, searches for the path of the communication peer, for example, BSID of the BS that covers the communication peer, or RSID of the RS that covers the communication peer, or ASN GW ID of the ASN GW that covers the communication peer, and sends an MS_uplink_information_ack to the RS, BS and ASN GW. The message includes information about the path of the peer.

Step 12: The RS, BS and ASN GW make the corresponding local switching decision respectively according to the obtained information about the path of the communication peer.

Step 13: The data is routed to the CSN as usual without being switched locally if it is found that the communication peer and the MS are not under the same RS, BS or ASN GW.

Step 14: It is determined that local switching is required if the communication peer and the MS are under the same RS, BS, or ASN GW. In this case, the local classifier needs to be updated according to the local switching control mode and the local switching subscription information. For the data that meets local switching conditions, for example, packets whose destination IP/MAC address meets the local switching conditions, packets of a user that require local switching, or packets of a service flow that require local switching, the data is sent to the downlink data path of the communication peer directly. FIG. 6 only shows the process of switching uplink data locally when the BS serves as a local switching enforcement point.

In this embodiment, the ASN GW may be a serving ASN GW or an anchor ASN GW. Moreover, the corresponding RS, BS or ASN GW makes the same local switching decision respectively to determine whether to perform local switching (namely, whether the local entity serves as a local switching enforcement point). If it is determined to perform local switching, the local switching is performed by the RS, BS, or ASN GW, where the RS, BS, or ASN GW may serve as a local switching enforcement point. FIG. 6 only shows the process of switching data locally when the anchor ASN GW serves as a local switching enforcement point, and the process is similar to that of steps 14-19 in the third embodiment.

Figure 7A:
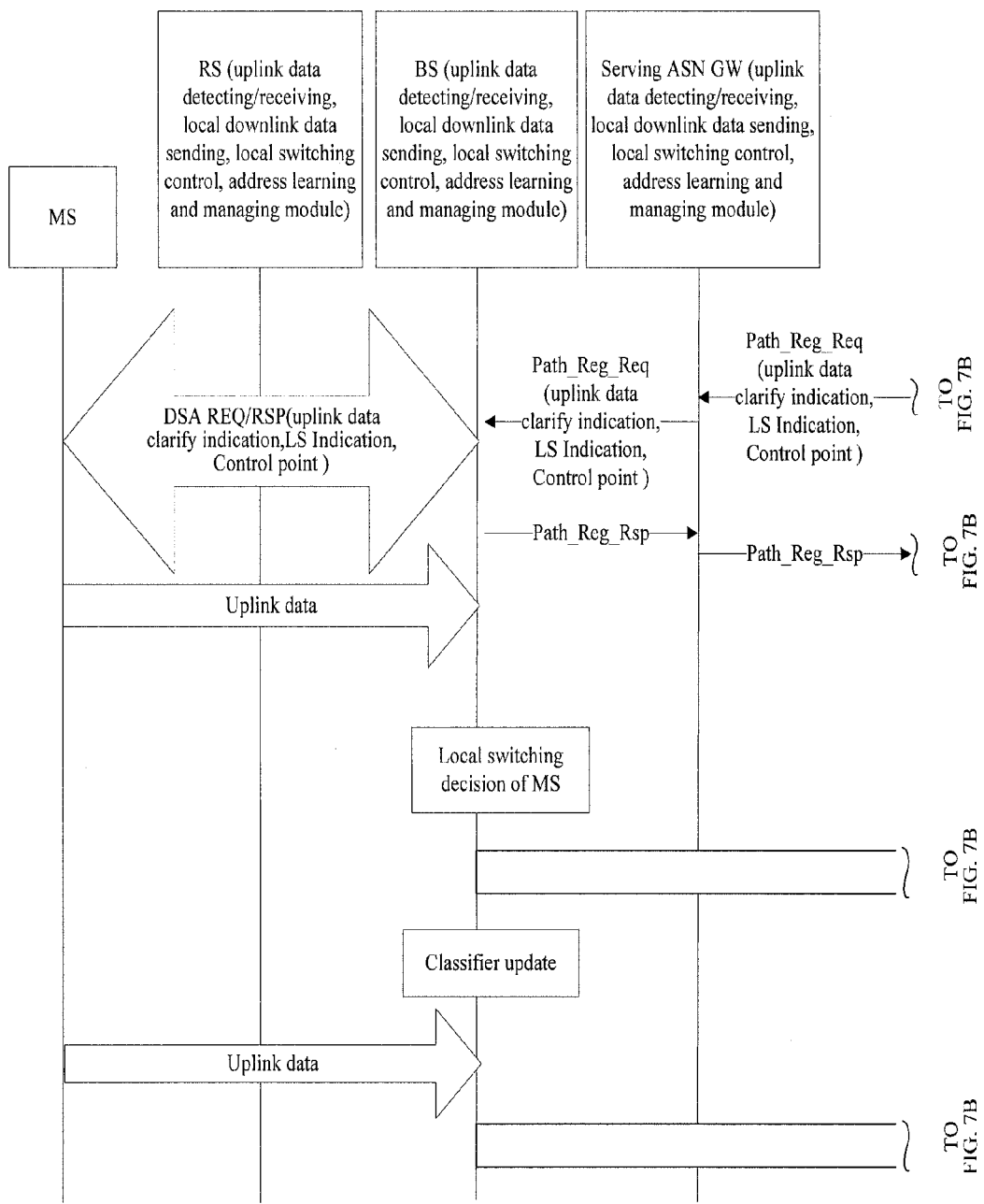
FIG. 7 is a second schematic diagram of a processing procedure according to a fourth embodiment of the present invention.
Figure 7B:
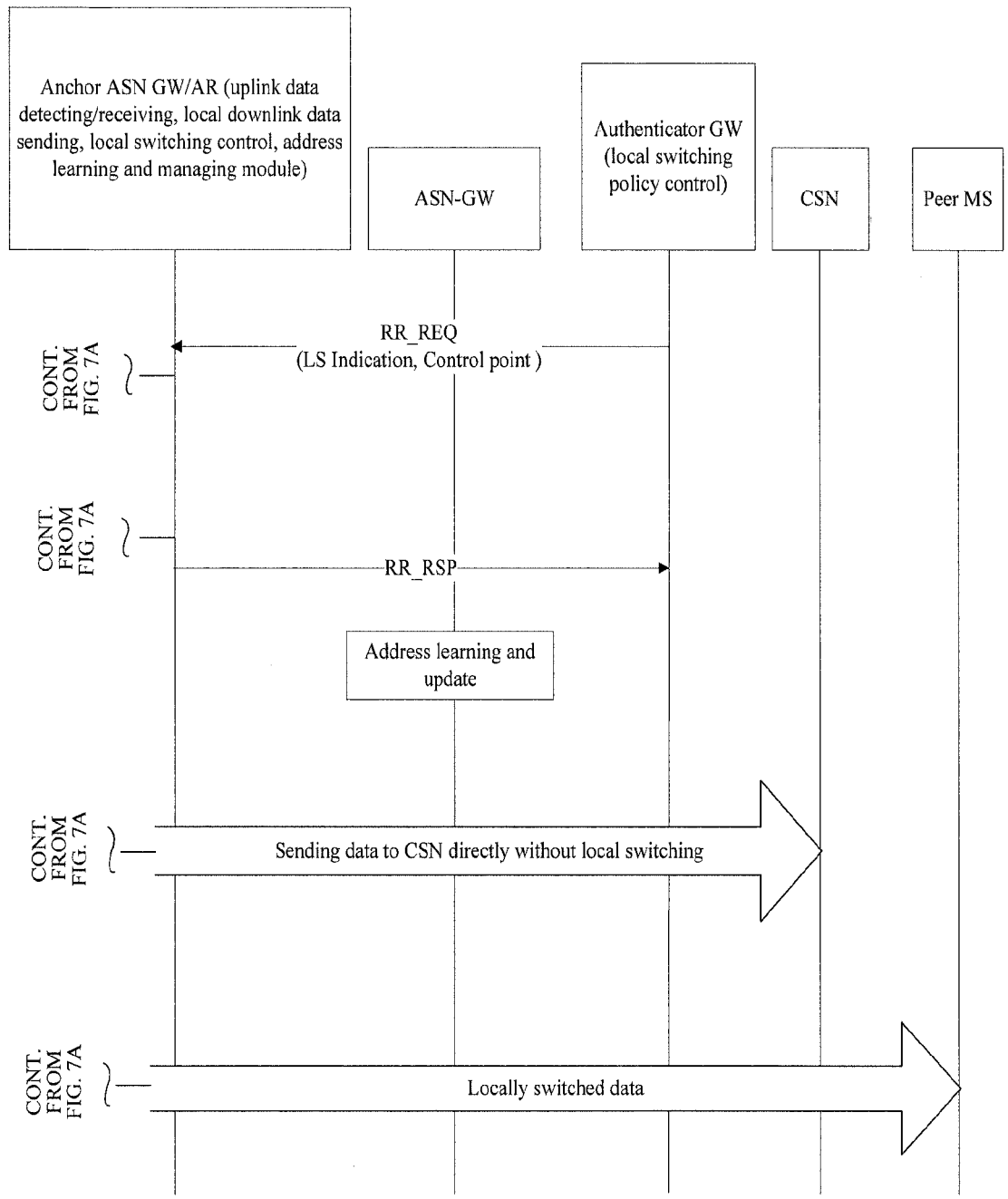

In the fourth embodiment, as shown in FIG. 7, the learning and managing module may be set in the RS, BS or ASN GW respectively; and the RS, BS or ASN GW learns and updates the corresponding address, and determines the path of the communication peer and the path of the MS or determines the first overlap point. That is, the RS, BS or ASN GW makes the local switching decision independently.

In the embodiments of the present invention above, data can be switched locally, the bandwidth of the backhaul network is saved, the cost of the operator is reduced, and the transmission resources are saved. That is, through the local switching solutions of the present invention, transmission bandwidth of the backhaul network is saved, transmission delay is shortened, better voice services can be provided, and the network transmission pressure is relieved.

Persons of ordinary skill in the art should understand that all or part of the steps of the method provided in the embodiments above may be implemented by a program instructing relevant hardware. The program may be stored in computer readable storage media. When the program runs, the program executes the steps of the method specified in any embodiment above. The storage media may be a magnetic disk, CD-ROM, Read-Only Memory (ROM), or Random Access Memory (RAM).

The above descriptions are merely exemplary embodiments of the present invention, but not intended to limit the protection scope of the present invention. Any modifications, variations or replacement that can be easily derived by those skilled in the art shall fall within the protection scope of the present invention. Therefore, the protection scope of the present invention is subject to the appended claims.

What is claimed is:

1. A method for performing local switching, comprising:
after receiving uplink data sent by a sending Mobile Station (MS), querying and determining, according to information carried in the uplink data, information about location of a receiving MS that is to receive uplink data; and
implementing, according to local switching rules, local switching for data to be transmitted between the sending MS and the receiving MS, if determined, according to the information about location of the receiving MS and information about location of the sending MS, that the data to be transmitted between the sending MS and the receiving MS meets local switching of data conditions for performing locally switched data transmission,
the local switching rules comprise local switching control mode and local switching subscription information,
the local switching control mode specifies whether to perform local switching, or a local switching control pattern, the local switching control pattern comprise a centralized control mode or a distributed control mode, wherein one entity makes a local switching decision in the centralized control mode, and multiple entities make the local switching decision in the distributed control mode, and
the local switching subscription information specifies rules subscribed to by a user for performing local switching.

2. The method according to claim 1, wherein:
the local switching rules subscribed to by the user for performing local switching comprise: at least one piece of information among local switching information based on the user, local switching information based on service flows, or local switching information based on location.

3. A system for performing local switching, comprising:
a location information managing module, adapted to manage information about location of Mobile Stations (MSs) in a communication network;
a local switching rule managing module, adapted to manage local switching rules; and
a local switching control module, adapted to query, according to information about location of a sending MS and information carried in uplink data sent by the sending MS, information about location of MSs managed by the location information managing module to obtain information about location of a receiving MS; and control, according to the local switching rules managed by the local switching rule managing module, implementation of local switching for data to be transmitted between the sending MS and the receiving MS after determining that the data to be transmitted between the sending MS and the receiving MS meets local switching of data conditions for performing locally switched data transmission, the local switching rules comprise local switching control mode and local switching subscription information, the local switching control mode specifies whether to perform local switching, or a local switching control pattern, the local switching control pattern comprise a centralized control mode or a distributed control mode, wherein one entity makes a local switching decision in the centralized control mode, and multiple entities make the local switching decision in the distributed control mode, and the local switching subscription information specifies rules subscribed to by a user for performing local switching.

4. The system according to claim 3, further comprising:

an uplink data detecting module, adapted to receive the uplink data sent by the sending MS; report a source address of the uplink data to the location information managing module so as to store the sending MS location information indexed by the source address; and report a destination address of the uplink data to the local switching control module so that the local switching control module uses the destination address as an index to search for information about the location of the receiving MS.

5. The system according to claim 4, wherein:

the uplink data detecting module is further adapted to receive classifier information sent by the local switching rule managing module, detect and receive the uplink data according to the classifier information, wherein the classifier information specifies an identifier of the uplink data that allows locally switched data transmission.

6. The system according to claim 3, wherein:

when the local switching control module performs, according to the local switching rules managed by the local switching rule managing module, local switching for the data transmitted between the sending MS and the receiving MS, the local switching control module further sends local switching control information, which is determined according to the local switching rules, to the local switching enforcement module; and the local switching module enforcement module performs, according to the local switching control information, local switching for the data transmitted between the sending MS and the receiving MS.

7. The system according to claim 3, wherein:

the location information managing module and the local switching control module are set in a first entity, and the local switching rule managing module is set in a second entity.

8. The system according to claim 3, wherein:

the location information managing module, the local switching rule managing module and the local switching control module are set in different entities or the same entity.

9. The system according to claim 7, wherein:

the uplink data detecting module is set in the first entity, or set in one or more entities independently, or is set together with the location information managing module, the local switching rule managing module and the local switching control module in the same entity; and the local switching enforcement module is set in the first entity, or set in one or more entities independently, or is set together with the location information managing module, the local switching rule managing module and the local switching control module in the same entity.

10. The system according to claim 9, wherein:

the communication networks comprise Worldwide Interoperability for Microwave Access (WiMAX) network; entities in the WiMAX network comprise: an Access Service Network (ASN) Gateway (GW), a Base Station (BS), a Relay Station (RS), and an authenticator GW; and the first entity comprises the ASN GW, BS or RS, and the second entity comprises the authenticator GW.

11. A local switching control entity, comprising:

a local switching condition judging module, adapted to determine information about location of a receiving Mobile Station (MS) according to information carried in a received packet, and determine, according to the information about location of the receiving MS and information about location of a sending MS, whether data to be transmitted between the sending MS and the receiving MS meets local switching of data conditions for performing locally switched data transmission; and a local switching control information sending unit, adapted to send local switching control information to a local switching enforcement entity according to local switching rules after the local switching condition judging module determines that the local switching conditions are met, so as to instruct the local switching enforcement entity to implement local switching of data according to the local switching control information, the local switching rules comprise local switching control mode and local switching subscription information, the local switching control mode specifies whether to perform local switching, or a local switching control pattern, the local switching control pattern comprise a centralized control mode or a distributed control mode, wherein one entity makes a local switching decision in the centralized control mode, and multiple entities make the local switching decision in the distributed control mode, and the local switching subscription information specifies rules subscribed to by a user for performing local switching.

12. The local switching control entity according to claim 11, wherein:

the entity further comprises a local switching rule receiving module, which is adapted to receive the local switching rules sent by a local switching rule managing entity, and determine, according to the local switching rules, the local switching control mode and the local switching enforcement entity.

13. The local switching control entity according to claim 12, wherein:

the local switching rules subscribed to by the user for performing local switching comprise: at least one piece of information among local switching information based on the user, local switching information based on service flows, or local switching information based on location.

* * * * *